H. P. WESTCOTT.
DEVICE FOR TESTING METERS.
APPLICATION FILED APR. 16, 1909.
949,640.
Patented Feb. 15, 1910.
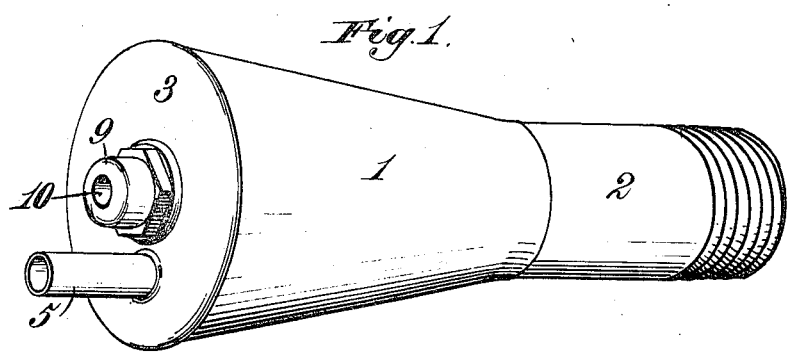
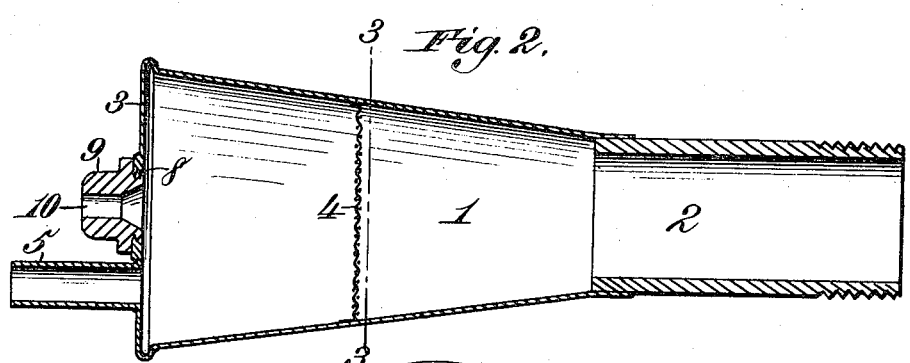
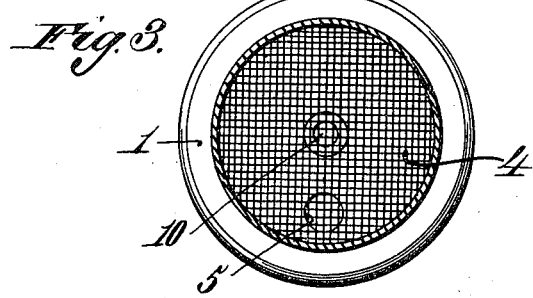
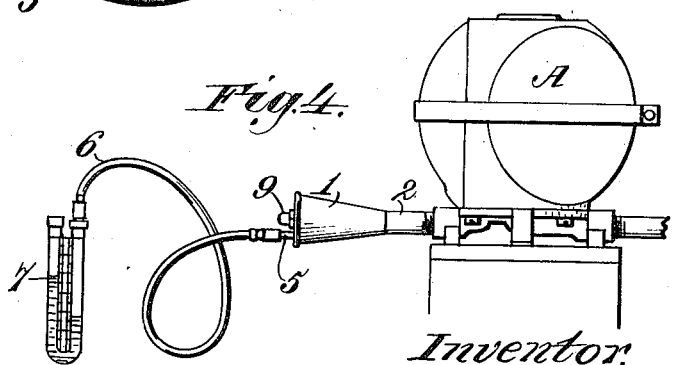
Witnesses,
Robert Couett
C. G. Kesler
Inventor,
Henry P. Westcott
By James L. Norris
Atty.

ved and will accompany each outfit.
UNITED STATES PATENT OFFICE.

HENRY P. WESTCOTT, OF ERIE, PENNSYLVANIA.

DEVICE FOR TESTING METERS.

949,640.

Specification of Letters Patent.   Patented Feb. 15, 1910.

Application filed April 16, 1909.   Serial No. 490,212.

*To all whom it may concern:*

Be it known that I, HENRY P. WESTCOTT, a citizen of the United States, residing at Erie, in the county of Erie and State of Pennsylvania, have invented new and useful Improvements in Devices for Testing Meters, of which the following is a specification.

This invention relates to new and useful improvements in attachments for testing fluid meters and it relates more particularly to a portable attachment of such organization that the adjunctive parts may be readily carried in the pocket or in a sling bag.

The device is of novel construction to permit of the use of any elastic fluid as the testing agent and accordingly may be used at the factory before the meters are put into service with air as the testing medium, or after they are put into service with the gas of the city supply as the testing medium, without the necessity of returning the meter to the factory or disconnecting the same from the service pipe.

The construction and use of the device is based on the fact that a determined elastic fluid at a given temperature and barometer and having some pressure determined by comparison with a standard pressure for a standard fluid will pass a certain volume through an aperture of given size in a certain number of seconds, the size of the aperture, the volume passed and the time required for its passage being the same in all instances after the necessary calculations to find the comparative pressure of the fluid as determined by its density have been made. Thus, air may be considered as the standard fluid, and a water pressure of two inches at a barometer of 29.2 and a temperature of 70 may be considered as the standard testing pressure. The calculation for the pressure of gas is made with regard to the above standards. The various requirements for meter testing need not be entered into with further detail since they are well understood by those practiced in the art and a list of the different specific gravities of gas in different parts of the country for the purposes of calculating the pressure at which the determined volume will pass through an aperture of given size in a determined period of time, accompanies each outfit, the determined pressure being regulated by properly positioning the valve of the service pipe.

In the accompanying drawings I have illustrated a preferred and advantageous embodiment of the invention, the structural details of which are set forth at length in the following description while the novel features by which the invention is distinguished from the prior art are recited in the claims appended at the end of the description.

In the said drawings: Figure 1 is a perspective view of the meter testing device unattached. Fig. 2 is a central longitudinal view thereof. Fig. 3 is a section on the line 3—3 of Fig. 2, looking toward the foraminous screening diaphragm, and Fig. 4 is a side elevation illustrating the device set up for use.

Similar characters of reference refer to corresponding parts throughout the several views.

The device, in its preferred embodiment, comprises a frusto-conical hollow body, as 1, to the smaller end of which is secured an axially extended pipe section, as 2, which in use is coupled to the outlet pipe of the meter to be tested, such meter being shown at A in Fig. 4, with the testing device applied thereto. The larger end of the body 1 is closed by a plate, as 3, which may be and preferably is permanently attached. At a point near the center of the body 1, a transverse foraminous diaphragm 4 is arranged. This diaphragm is preferably of fine wire mesh and is provided for the purpose of screening suspended solid matter.

The plate 3 is provided with an outwardly projecting nipple, as 5, to which is connected a flexible tube, as 6, the latter leading to any suitable pressure gage, as, for example, a water gage, as 7. This arrangement is shown in Fig. 4. The plate 3 is also provided with a threaded opening, as 8, into which is screwed a boss, as 9. The boss 9 is provided with a bore, as 10, of the proper size to pass a given volume of the standard fluid in a given period of time and in order that the volume may be varied, bosses having bores of different sizes may be provided and will accompany each outfit. Thus, with air as the standard fluid, an opening having a diameter just a shade above 9/32 of an inch will pass four feet of air at a temperature of 70° and a two-inch water pressure in one hundred seconds and one hundred and forty-four feet in an hour and an opening about 3/8 of an inch in diameter will pass eight feet of air in a hundred seconds. The size of the opening to be employed in making the test will of course depend upon the circumstances and conditions of use. In the example first given, wherein four feet of air are passed in a hundred seconds, if the meter gives a reading of four feet in ninety-six seconds it is four per cent. fast and if it gives a reading of four feet in one hundred and four seconds, it is four per cent. slow. It will be understood that in using gas as the testing medium, the pressure at which four or eight feet will be passed through openings of the size stated will vary from the air pressure, and the necessary calculations having been made to determine the gas pressure necessary for making the test and the device having been connected up, as shown in Fig. 4, the valve of the service pipe is regulated until the gage 7 gives the required reading indicative of the determined pressure and the test is made in the manner aforesaid. The device is of course set up in the same manner for making the test with air at the factory, in which case it will be understood that the inlet side of the meter is connected up with some suitable source of air supply, e. g., a tank or pump.

The device may be readily set up and dismantled and may be used with equal facility with meters at the factory or in service and by a skilled workman or an unskilled layman. Inasmuch as all the openings are very carefully filed out to the exact measurement required, the indications of the device are absolutely reliable, by virtue of the fact that they are dependent upon the combined and methodical use, provided for by the present arrangement, of facts or laws of nature which are invariable.

The device while efficiently carrying out the objects stated retains also the advantageous incidents of simplicity of details and inexpensiveness.

Having fully described my invention, I claim:

1. An apparatus for testing meters with elastic fluid comprising a hollow body provided with a pipe section for attachment to the outlet side of the meter to be tested and with an opening through which the measuring liquid flows to the atmosphere, a pressure gage, a nipple projecting from the body and a pipe connecting the nipple and the pressure gage.

2. A meter testing device comprising a hollow body provided with a pipe section for attachment to the outlet side of the meter to be tested, a plug removably fitted in the body and having an opening through which the measuring fluid flows, and a nipple projecting from the body to receive a pipe for attachment to a gage.

3. A meter testing device comprising a frusto-conical hollow body, a pipe section leading from the smaller end thereof and a plate closing the larger end thereof and provided with an outwardly projecting nipple and an opening for the passage of the measuring fluid.

4. A meter testing device comprising a frusto-conical hollow body, a pipe section leading from the smaller end thereof, a plate closing the larger end thereof and provided with an outwardly projecting nipple and a plug removably fitted in the plate and having an opening to pass the measuring fluid.

5. An apparatus for testing meters with elastic fluid comprising a hollow body constructed for direct attachment to the meter, a pressure gage in communication with the body and an apertured plug removably fitted to the body and constituting means for passing fluid to the air.

In testimony whereof I have hereunto set my hand in presence of two subscribing witnesses.

HENRY P. WESTCOTT.

Witnesses:
 A. B. GALLAGHER,
 J. M. HIRT.